United States Patent
Livhits et al.

(10) Patent No.: US 10,776,797 B2
(45) Date of Patent: *Sep. 15, 2020

(54) CONTENT CONSUMPTION MONITOR

(71) Applicant: BOMBORA, INC., New York, NY (US)

(72) Inventors: Anthony Livhits, Forest Hills, NY (US); Cynthia Huynh, Nutley, NJ (US); Hassan Ahmed, Brooklyn, NY (US); Benny Lin, Brooklyn, NY (US); Robert Armstrong, Brooklyn, NY (US); Erik Matlick, New York, NY (US); Mark Herschberg, New York, NY (US)

(73) Assignee: BOMBORA, INC., New York, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/900,208

(22) Filed: Feb. 20, 2018

(65) Prior Publication Data

US 2018/0174163 A1    Jun. 21, 2018

Related U.S. Application Data

(63) Continuation of application No. 14/498,056, filed on Sep. 26, 2014, now Pat. No. 9,940,634.

(51) Int. Cl.
*G06Q 30/02* (2012.01)

(52) U.S. Cl.
CPC ..... *G06Q 30/0201* (2013.01); *G06Q 30/0269* (2013.01)

(58) Field of Classification Search
CPC ......... G06Q 10/00; G06Q 40/00; G06Q 40/06
(Continued)

(56) References Cited

U.S. PATENT DOCUMENTS 7,185,065 B1  2/2007  Holtzman
8,392,252 B2  3/2013  Kaufman
(Continued)

FOREIGN PATENT DOCUMENTS

WO    2014/054052 A2    4/2014
WO    2017/116493 A1    7/2017

OTHER PUBLICATIONS

Burby, et al. "Web Analytics Definitions" Web Analytics Association; version 4.0; Aug. 23, 2007; XP055505869; retrieved from the Internet on Sep. 10, 2018 at: <https://www.digitalanalyticsassociation.org/Files/PDF_standards/WebAnalyticsDefinitionsVol1.pdf>.

(Continued)

*Primary Examiner* — Romain Jeanty
(74) *Attorney, Agent, or Firm* — Schwabe Williamson & Wyatt, PC

(57) ABSTRACT

A content consumption monitor (CCM) generates intent data that identifies topics of real-time interest to users. The CCM uses the intent data to direct information to more interested audiences and reduce the information noise/overload that may prevent users from viewing information. This targeted information may increase user conversion rates for seminars, advertising, documents downloads, or any other activity associated with published information. In one example, the CCM generates the intent data from third party content. Using a wide variety of third party content enables the CCM to better identify current user interests. The CCM may aggregate the intent data for different demographics, such as for companies, job positions, age, gender, or geographic locations.

20 Claims, 8 Drawing Sheets

(58) Field of Classification Search
USPC .................................................... 705/7.29
See application file for complete search history.

(56) References Cited

U.S. PATENT DOCUMENTS

| | | | |
|---|---|---|---|
| 8,392,543 B1* | 3/2013 | Singh | H04L 67/1095 |
| | | | 709/221 |
| 8,725,712 B2 | 5/2014 | Arrasvuori | |
| 9,092,829 B2 | 7/2015 | Fleischman | |
| 9,152,970 B1* | 10/2015 | Trahan | G06Q 30/02 |
| 9,177,142 B2 | 11/2015 | Montoro | |
| 9,514,368 B2 | 12/2016 | Pitt | |
| 9,514,461 B2 | 12/2016 | George | |
| 9,521,157 B1 | 12/2016 | D'Aveta | |
| 9,560,423 B1* | 1/2017 | Chang | H04N 21/812 |
| 9,667,733 B2 | 5/2017 | Dhawan | |
| 9,706,008 B2* | 7/2017 | Rajan | H04L 67/22 |
| 9,753,923 B2 | 9/2017 | Fleischman | |
| 9,779,144 B1 | 10/2017 | Hampson | |
| 9,940,634 B1* | 4/2018 | Livhits | G06Q 30/0201 |
| 10,430,806 B2 | 10/2019 | Chang | |
| 2002/0173971 A1 | 11/2002 | Stirpe | |
| 2003/0154398 A1* | 8/2003 | Eaton | G06Q 30/08 |
| | | | 709/227 |
| 2004/0267723 A1 | 12/2004 | Bharat | |
| 2007/0156392 A1 | 7/2007 | Balchandran | |
| 2008/0126178 A1 | 5/2008 | Moore | |
| 2010/0100537 A1 | 4/2010 | Druzgalski | |
| 2010/0250341 A1 | 9/2010 | Hauser | |
| 2010/0293057 A1 | 11/2010 | Haveliwala | |
| 2011/0252427 A1 | 10/2011 | Olston | |
| 2011/0320715 A1 | 12/2011 | Ickman | |
| 2012/0158693 A1 | 6/2012 | Papadimitriou | |
| 2012/0209795 A1 | 8/2012 | Glickman | |
| 2012/0215640 A1 | 8/2012 | Ramer | |
| 2013/0066677 A1 | 3/2013 | Killoh | |
| 2013/0073473 A1 | 3/2013 | Heath | |
| 2013/0124193 A1 | 5/2013 | Holmberg | |
| 2013/0132339 A1 | 5/2013 | Mirus | |
| 2013/0151687 A1* | 6/2013 | Mooneyham | G06Q 30/02 |
| | | | 709/224 |
| 2013/0159505 A1 | 6/2013 | Mason | |
| 2013/0204663 A1 | 8/2013 | Kahlow | |
| 2013/0216134 A1 | 8/2013 | Yu | |
| 2014/0067831 A1 | 3/2014 | Swamidas | |
| 2014/0096035 A1 | 4/2014 | Hall | |
| 2014/0156681 A1 | 6/2014 | Lee | |
| 2014/0201061 A1 | 7/2014 | Sivacki | |
| 2014/0201240 A1 | 7/2014 | Andavarapu | |
| 2014/0229164 A1 | 8/2014 | Martens | |
| 2014/0278308 A1 | 9/2014 | Liu | |
| 2014/0278916 A1 | 9/2014 | Nukala | |
| 2014/0278959 A1 | 9/2014 | Nukala | |
| 2014/0280549 A1* | 9/2014 | Rajan | H04L 67/22 |
| | | | 709/204 |
| 2014/0280890 A1 | 9/2014 | Yi | |
| 2014/0325030 A1* | 10/2014 | Maharajh | H04W 4/025 |
| | | | 709/219 |
| 2015/0074131 A1 | 3/2015 | Fernandez | |
| 2015/0309965 A1 | 10/2015 | Brav | |
| 2016/0048880 A1 | 2/2016 | Linden | |
| 2016/0132906 A1 | 5/2016 | Khavronin | |
| 2016/0371725 A1 | 12/2016 | Nguyen | |
| 2017/0031907 A1 | 2/2017 | Juang | |
| 2017/0364931 A1 | 12/2017 | Khavronin | |
| 2018/0365710 A1 | 12/2018 | Halecky | |
| 2019/0050874 A1 | 2/2019 | Matlick | |
| 2019/0294642 A1 | 9/2019 | Matlick | |

OTHER PUBLICATIONS

Extended European Search Report for EP App. No. 18190771.8 dated Oct. 22, 2018; 8 pages.
PCT, International Search Report and Written Opinion of the International Searching Authority for International Application No. PCT/US16/35186, dated Nov. 4, 2016; 23 pages.
Snoek, et al., "Practical Bayesian Optimization of Machine Learning Algorithms"; dated Aug. 29, 2012; 12 pages.
McCallum, et al., "A Comparison of Event Models for Naive Bayes Text Classification"; Learning for Text Categorization: Papers from the 1998 AAAI Workshop; 8 pages.
Mikolov, et al., "Efficient Estimation of Word Representations in Vector Space"; dated Jan. 16, 2013; 12 pages.
Extended European Search Report for EP App. No. 16882214.6 dated Jul. 4, 2019; 9 pages.
Withers, "What is Buyer Intent Data? A Guide for 2020"; dated Apr. 1, 2020; retrieved from the Internet at <https://blog.zoominfo.com/how-to-use-internet-data/>; 6 pages.
"ZoomInfo Launches Intent Solution for Marketing and Sales", dated Apr. 9, 2020; retrieved from the Internet at <https://destinationcrm.com/ . . . News/CRM-Across-the-Wire/ZoomInfo-Launches-Intent-Solution-for-Marketing-and-Sales-140221.aspx>; 2 pages.
"ZoomInfo Launches 'Intent' Solution to Help B2B Companies Identify, Prioritize and Engage Sales Leads Based on Buying Signals" dated Apr. 9, 2020; retrieved from the Internet at <https://www.businesswire.com/news/home/20200409005418/en/ZoomInfo-Launches-'Intent'-Solution_B2B_Comapnies-Identify>; 2 pages.

* cited by examiner

CONTENT CONSUMPTION MONITOR

CROSS-REFERENCE TO RELATED APPLICATIONS

This application is a continuation of U.S. patent application Ser. No. 14/498,056, filed Sep. 26, 2014, the entire disclosure of which is incorporated herein by reference.

BACKGROUND

Users receive a random variety of different information from a random variety of different businesses. For example, users may constantly receive promotional announcements, advertisements, information notices, event notifications, etc. Users request some of this information. For example, a user may register on a company website to receive sales or information announcements. However, much of the information sent by the company is of little or no interest to the user. For example, the company may send the user emails announcing every upcoming seminar, regardless of the subject matter.

The user also may receive unsolicited information. For example, a user may register on a website to download a white paper on a particular subject. A lead service then sells the email address to companies that send the user unsolicited advertisements. Users end up ignoring most or all of these emails since most of the information has no relevance or interest. Alternatively, the user directs all of these emails into a junk email folder.

DETAILED DESCRIPTION

A content consumption monitor (CCM) generates intent data that identifies topics of real-time interest to users. The CCM uses the intent data to direct information to more interested audiences and reduce the information noise/overload that may prevent users from viewing on-line information. Publishers using the targeted intent data may increase conversion rates for seminars, advertising, documents downloads, or any other activity associated with published information. Publishers may also include advertisers, or any other entity using the segmentation information.

In one example, the CCM generates user profiles that identify user interests. The user interests are alternatively referred to as user intent. The user profiles better represent current user interests by using a wide variety of different third party content.

The CCM may weigh topics in the user profiles based on different online and offline user activities. For example, the CCM may apply higher weights for more assertive user activities, such as registering for seminars or downloading electronic documents. The CCM may apply lower weights to more passive user activities, such as viewing a web page. These weightings operate in an "actions speak louder than words" manner where the activities associated with accessing content may provide a truer indication of user interests.

The CCM can aggregate intent data for different categories, such as by company, job title, geographic location, etc. The CCM can further segment entities within the different categories. For example, the CCM may identify companies interested in particular topics and direct content related to those topics to particular officers or persons within those companies.

Figure 1:
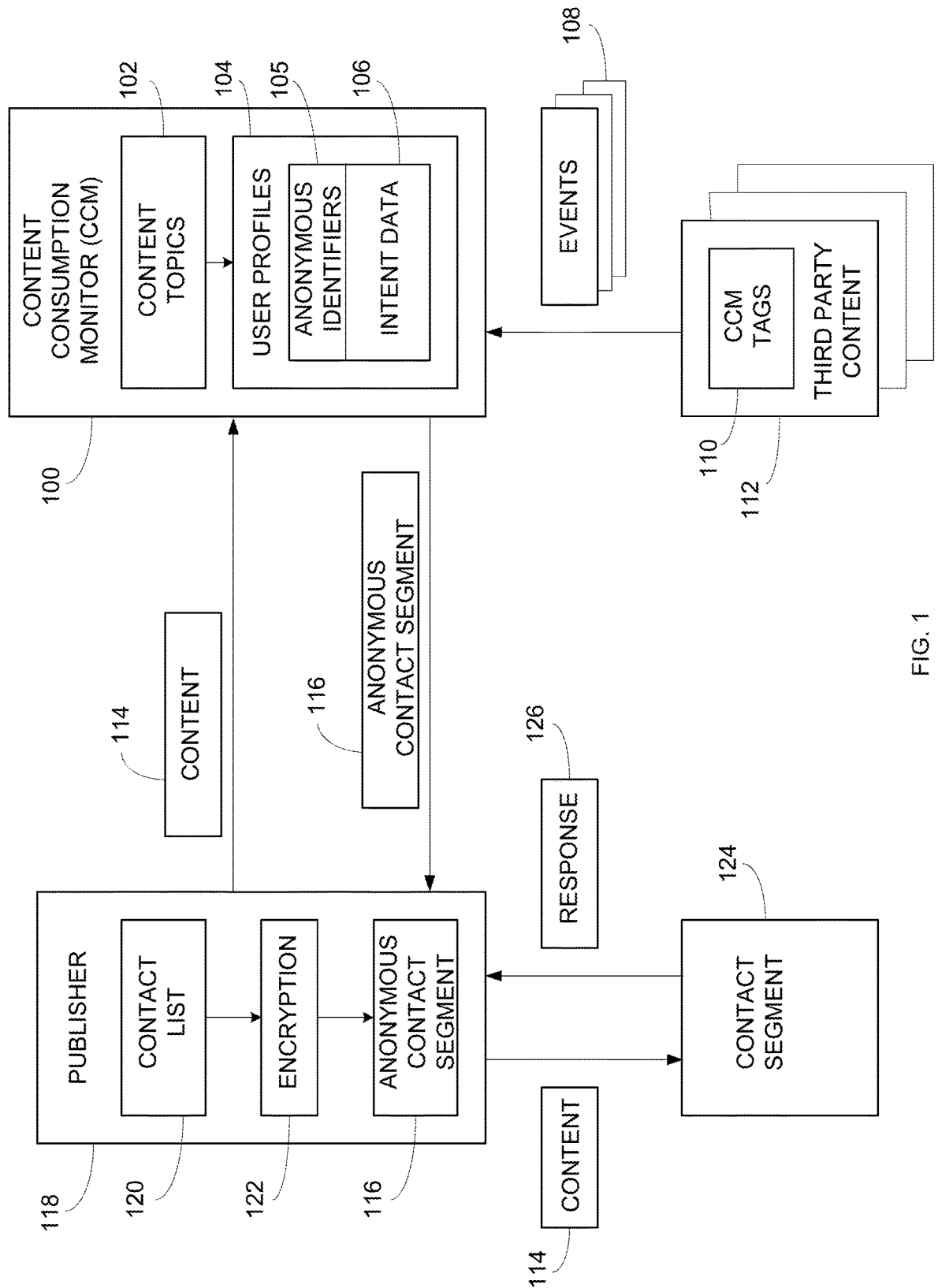
FIG. 1 depicts an example content consumption monitor (CCM).

FIG. 1 depicts a content consumption monitor (CCM) 100. CCM 100 may be a server or any other computing system that communicates with a publisher 118 and monitors user accesses to third party content 112. Publisher 118 is any server or computer operated by a company or individual that wants to send content 114 to an interested group of users. This group of users is alternatively referred to as contact segment 124.

For example, publisher 118 may be a company that sells electric cars. Publisher 118 may have a contact list 120 of email addresses for customers that have attended prior seminars or have registered on the publisher website. Contact list 120 also may be generated by CCM tags 110 that are described in more detail below. Publisher 118 also may generate contact list 120 from lead lists provided by third parties lead services, retail outlets, and/or other promotions or points of sale, or the like or any combination thereof. Publisher may want to send email announcements for an upcoming electric car seminar. Publisher 118 would like to increase the number of attendees at the seminar.

Third party content 112 comprises any information on any subject accessed by any user. Third party content 112 may include web pages provided on website servers operated by different businesses and/or individuals. For example, third party content 112 may come from different websites operated by on-line retailers and wholesalers, on-line newspapers, universities, blogs, municipalities, social media sites, or any other entity that supplies content.

Third party content 112 also may include information not accessed directly from websites. For example, users may access registration information at seminars, retail stores, and other events. Third party content 112 also may include content provided by publisher 118.

Computers and/or servers associated with publisher 118, content segment 124, CCM 100 and third party content 112 may communicate over the Internet or any other wired or wireless network including local area networks (LANs), wide area networks (WANs), wireless networks, cellular networks, Wi-Fi networks, Bluetooth® networks, cable networks, or the like, or any combination thereof.

Some of third party content 112 may contain CCM tags 110 that capture and send events 108 to CCM 100. For example, CCM tags 110 may comprise JavaScript added to website web pages. The website downloads the web pages, along with CCM tags 110, to user computers. User computers may include any communication and/or processing device including but not limited to laptop computers, personal computers, smart phones, terminals, tablet computers, or the like, or any combination thereof. CCM tags 110 monitor web sessions send some captured web session events 108 to CCM 100.

Events 108 may identify third party content 112 and identify the user accessing third party content 112. For example, event 108 may include a universal resource locator (URL) link to third party content 112 and may include an hashed user email address or cookie identifier associated with the user that accessed third party content 112. Event 108 also may identify an access activity associated with third party content 112. For example, event 108 may indicate the user viewed a web page, downloaded an electronic document, or registered for a seminar.

CCM 100 builds user profiles 104 from events 108. User profiles 104 may include anonymous identifiers 105 that associate third party content 112 with particular users. User profiles 104 also may include intent data 106 that identifies topics in third party content 112 accessed by the users. For example, intent data 106 may comprise a user intent vector that identifies the topics and identifies levels of user interest in the topics.

As mentioned above, publisher 118 may want to send an email announcing an electric car seminar to a particular contact segment 124 of users interested in electric cars. Publisher 118 sends the email as content 114 to CCM 100. CCM 100 identifies topics 102 in content 114.

CCM 100 compares content topics 102 with intent data 106. CCM 100 identifies the user profiles 104 that indicate an interest in content 114. CCM 100 sends anonymous identifiers 105 for the identified user profiles 104 to publisher 118 as anonymous contact segment 116.

Contact list 120 may include user identifiers, such as email addresses, names, phone numbers, or the like, or any combination thereof. The identifiers in contact list 120 are hashed or otherwise de-identified by an algorithm 122. Publisher 118 compares the hashed identifiers from contact list 120 with the anonymous identifiers 105 in anonymous contact segment 116.

Any matching identifiers are identified as contact segment 124. Publisher 118 identifies the unencrypted email addresses in contact list 120 associated with contact segment 124. Publisher 118 sends content 114 to the email addresses identified for contact segment 124. For example, publisher 118 sends email announcing the electric car seminar to contact segment 124.

Sending content 114 to contact segment 124 may generate a substantial lift in the number of positive responses 126. For example, assume publisher 118 wants to send emails announcing early bird specials for the upcoming seminar. The seminar may include ten different tracks, such as electric cars, environmental issues, renewable energy, etc. In the past, publisher 118 may have sent ten different emails for each separate track to everyone in contact list 120.

Publisher 118 may now only send the email regarding the electric car track to contacts identified in contact segment 124. The number of positive responses 126 registering for the electric car track of the seminar may substantially increase since content 114 is now directed to users interested in electric cars.

In another example, CCM 100 may provide local ad campaign or email segmentation. For example, CCM 100 may provide a "yes" or "no" as to whether a particular advertisement should be shown to a particular user. In this example, CCM 100 may use the hashed data without re-identification of users and the "yes/no" action recommendation may key off of a de-identified hash value.

CCM 100 may revitalize cold contacts in publisher contact list 120. CCM 100 can identify the users in contact list 120 that are currently accessing other third party content 112 and identify the topics associated with third party content 112. By monitoring accesses to third party content 112, CCM 100 may identify current user interests even though those interests may not align with the content currently provided by publisher 118. Publisher 118 might reengage the cold contacts by providing content 114 more aligned with the most relevant topics identified in third party content 112.

Figure 2:
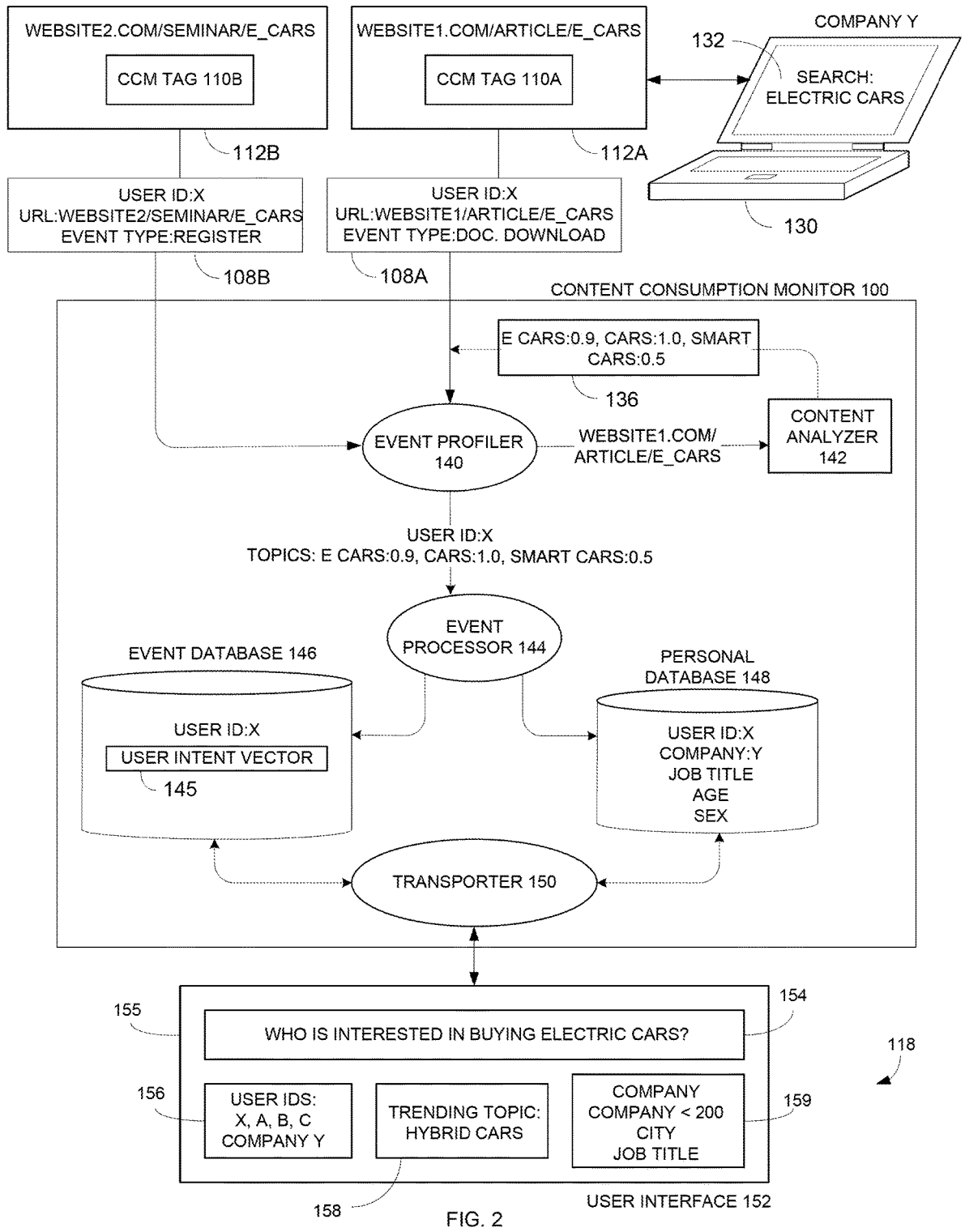
FIG. 2 depicts an example of the CCM in more detail.

FIG. 2 is a diagram explaining the content consumption manager in more detail. A user may enter a search query 132 into a computer 130 via a search engine. The user may work for a company Y. For example, the user may have an associated email address USER@COMPANY_Y.com.

In response to search query 132, the search engine may display links to content 112A and 112B on website1 and website2, respectively. The user may click on the link to website1. Website1 may download a web page to computer 130 that includes a link to a white paper. Website1 may include one or more web pages with CCM tags 110A that capture different events during the web session between website1 and computer 130. Website1 or another website may have downloaded a cookie onto a web browser operating on computer 130. The cookie may comprise an identifier X, such as a unique alphanumeric set of characters associated with computer 130.

During the web session with website1, the user of computer 130 may click on a link to white paper 112A. In response to the mouse click, CCM tag 110A may download an event 108A to CCM 100. Event 108A may identify the cookie identifier X loaded on the web browser of computer 130. In addition or alternatively, CCM tag 110A may capture a user name and/or email address entered into one or more web page fields during the web session. CCM tag 110 hashes the email address and includes the hashed email address in event 108A. Any identifier associated with the user is referred to generally as user X or user ID.

CCM tag 110A may also include a link in event 108A to the white paper downloaded from website1 to computer 130. For example, CCM tag 110A may capture the universal resource locator (URL) for white paper 112A. CCM tag 110A also may include an event type identifier in event 108A that identifies an action or activity associated with content 112A. For example, CCM tag 110A may insert an event type identifier into event 108A that indicates the user downloaded an electric document.

CCM tag 110A also may identify the launching platform for accessing content 112B. For example, CCM tag 110B may identify a link www.searchengine.com to the search engine used for accessing website1.

An event profiler 140 in CCM 100 forwards the URL identified in event 108A to a content analyzer 142. Content analyzer 142 generates a set of topics 136 associated with or suggested by white paper 112A. For example, topics 136 may include electric cars, cars, smart cars, electric batteries, etc. Each topic 136 may have an associated relevancy score indicating the relevancy of the topic in white paper 112A. Content analyzers that identify topics in documents are known to those skilled in the art and are therefore not described in further detail.

Event profiler 140 forwards the user ID, topics 136, event type, and any other data from event 108A to event processor 144. Event processor 144 may store personal information captured in event 108A in a personal database 148. For example, during the web session with website1, the user may have entered an employer company name into a web page form field. CCM tag 110A may copy the employer company name into event 108A. Alternatively, CCM 100 may identify the company name from a domain name of the user email address.

Event processor 144 may store other demographic information from event 108A in personal database 148, such as user job title, age, sex, geographic location (postal address), etc. In one example, some of the information in personal database 148 is hashed, such as the user ID and or any other personally identifiable information. Other information in personal database 148 may be anonymous to any specific user, such as company name and job title.

Event processor 144 builds a user intent vector 145 from topic vectors 136. Event processor 144 continuously updates user intent vector 145 based on other received events 108. For example, the search engine may display a second link to website2 in response to search query 132. User X may click on the second link and website2 may download a web page to computer 130 announcing the seminar on electric cars.

The web page downloaded by website2 also may include a CCM tag 110B. User X may register for the seminar during the web session with website2. CCM tag 110B may generate a second event 108B that includes the user ID: X, a URL link to the web page announcing the seminar, and an event type indicating the user registered for the electric car seminar advertised on the web page.

CCM tag 110B sends event 108B to CCM 100. Content analyzer 142 generates a second set of topics 136. Event 108B may contain additional personal information associated with user X. Event processor 144 may add the additional personal information to personal database 148.

Event processor 144 updates user intent vector 145 based on the second set of topics 136 identified for event 108B. Event processor 144 may add new topics to user intent vector 145 or may change the relevancy scores for existing topics. For example, topics identified in both event 108A and 108B may be assigned higher relevancy scores. Event processor 144 also may adjust relevancy scores based on the associated event type identified in events 108.

Publisher 118 may submit a search query 154 to CCM 100 via a user interface 152 on a computer 155. For example, search query 154 may ask WHO IS INTERESTED IN BUYING ELECTRIC CARS? A transporter 150 in CCM 100 searches user intent vectors 145 for electric car topics with high relevancy scores. Transporter 150 may identify user intent vector 145 for user X. Transporter 150 identifies user X and other users A, B, and C interested in electric cars in search results 156.

As mentioned above, the user IDs may be hashed and CCM 100 may not know the actual identities of users X, A, B, and C. CCM 100 may provide a segment of hashed user IDs X, A, B, and C to publisher 118 in response to query 154.

Publisher 118 may have a contact list 120 of users (FIG. 1). Publisher 118 may hash email addresses in contact list 120 and compare the hashed identifiers with the encrypted or hashed user IDs X, A, B, and C. Publisher 118 identifies the unencrypted email address for matching user identifiers. Publisher 118 then sends information related to electric cars to the email addresses of the identified user segment. For example, publisher 118 may send emails containing white papers, advertisements, articles, announcements, seminar notifications, or the like, or any combination thereof.

CCM 100 may provide other information in response to search query 154. For example, event processor 144 may aggregate user intent vectors 145 for users employed by the same company Y into a company intent vector. The company intent vector for company Y may indicate a strong interest in electric cars. Accordingly, CCM 100 may identify company Y in search results 156. By aggregating user intent vectors 145, CCM 100 can identify the intent of a company or other category without disclosing any specific user personal information, e.g., without regarding a user's online browsing activity.

CCM 100 continuously receives events 108 for different third party content. Event processor 144 may aggregate events 108 for a particular time period, such as for a current day or for the past 30 days. Event processor 144 then may identify trending topics 158 within that particular time period. For example, event processor 144 may identify the topics with the highest average relevancy values over the last 30 days.

Different filters 159 may be applied to the intent data stored in event database 146. For example, filters 159 may direct event processor 144 to identify users in a particular company Y that are interested in electric cars. In another example, filters 159 may direct event processor 144 to identify companies with less than 200 employees that are interested in electric cars.

Filters 159 also may direct event processor 144 to identify users with a particular job title that are interested in electric cars or identify users in a particular city that are interested in electric cars. CCM 100 may use any demographic information in personal database 148 for filtering query 154.

CCM 100 monitors content accessed from multiple different third party websites. This allows CCM 100 to better identify the current intent for a wider variety of users, companies, or any other demographics. CCM 100 may use hashed and/or other anonymous identifiers to maintain user privacy. CCM 100 further maintains user anonymity by identifying the intent of generic user segments, such as companies, marketing groups, geographic locations, or any other user demographics.

Figure 3:
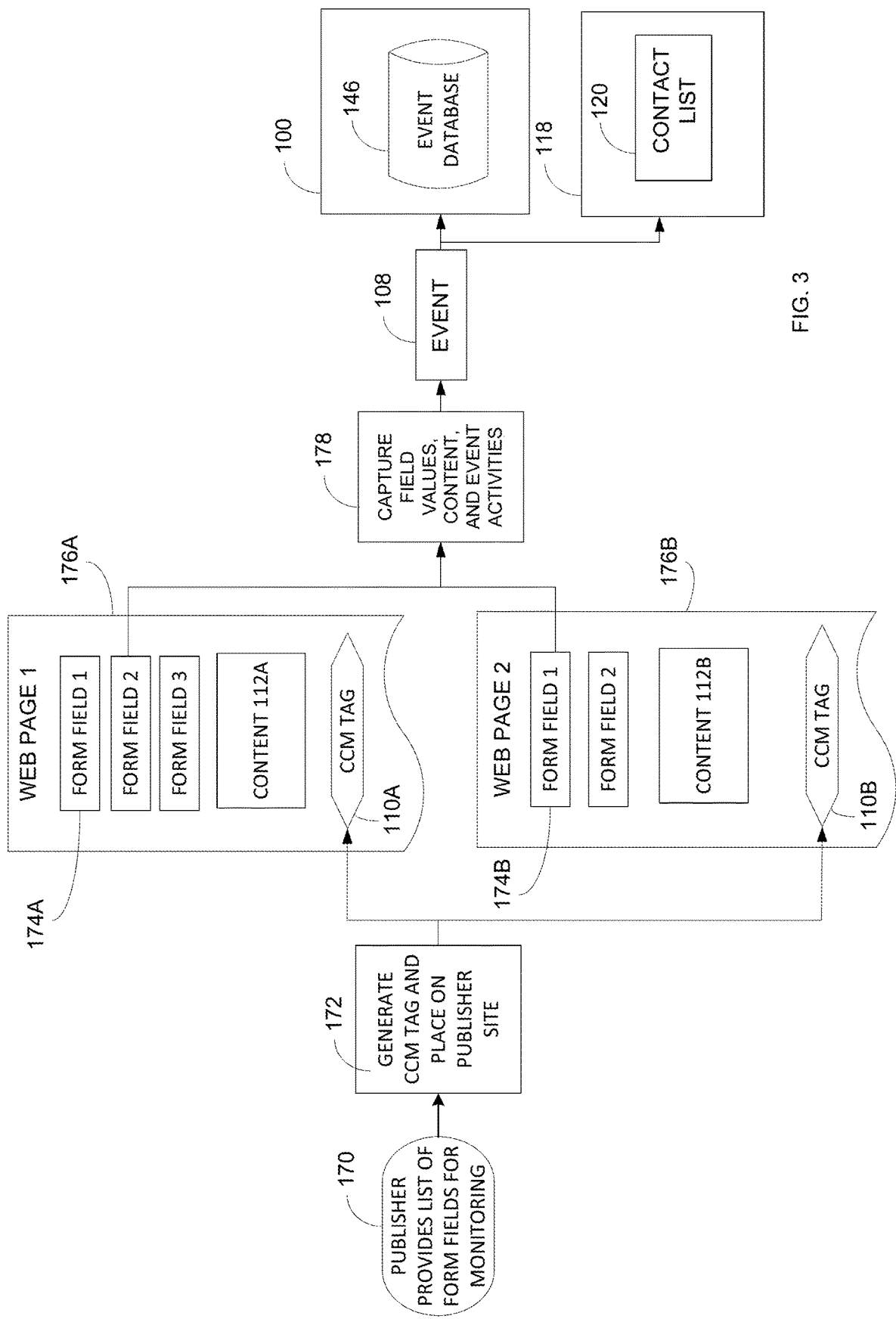
FIG. 3 depicts an example operation of a CCM tag.

FIG. 3 depicts example operations performed by CCM tags. In operation 170, a publisher provides a list of form fields 174 for monitoring on web pages 176. In operation 172, CCM tags 110 are generated and loaded in web pages 176 on the publisher website. For example, CCM tag 110A is loaded onto a first web page 176A of the publisher website and a CCM tag 110B is loaded onto a second web page 176B of the publisher website. In one example, CCM tags 110 comprise JavaScript loaded into the web page document object model (DOM).

The publisher may download web pages 176, along with CCM tags 110, to user computers during web sessions. CCM tag 110A captures the data entered into some of form fields 174A and CCM tag 110B captures data entered into some of form fields 174B.

A user enters information into form fields 174A and 174B during the web session. For example, the user may enter an email address into one of form fields 174A during a user registration process. CCM tags 110 may capture the email address in operation 178, validate and hash the email address, and then send the hashed email address to CCM 100 in event 108.

CCM tags 100 may first confirm the email address includes a valid domain syntax and then use a hash algorithm to encode the valid email address string. CCM tags 110 also may capture other anonymous user identifiers, such as a cookie identifier. If no identifiers exist, CCM tag 110 may create a unique identifier.

CCM tags 110 may capture any information entered into fields 174. For example, CCM tags 110 also may capture user demographic data, such as company name, age, sex, postal address, etc. In one example, CCM tags 110 capture some the information for publisher contact list 120.

CCM tags 110 also may identify content 112 and associated event activities in operation 178. For example, CCM tag 110A may detect a user downloading a white paper 112A or registering for a seminar. CCM tag 110A captures the URL for white paper 112A and generates an event type identifier that identifies the event as a document download.

Depending on the application, CCM tag 110 in operation 178 sends the captured web session information in event 108 to publisher 118 or to CCM 100. For example, event 108 is sent to publisher 118 when CCM tag 110 is used for generating publisher contact list 120. Event 108 is sent to CCM 100 when CCM tag 110 is used for generating intent data.

CCM tags 110 may capture the web session information in response to the user leaving web page 176, existing one of form fields 174, selecting a submit icon, mousing out of one of form fields 174, a mouse click, an off focus, or any other user action. Note again that CCM 100 might never receive personally identifiable information (PII) since any PII data in event 108 is hashed by CCM tag 110.

Figure 4:
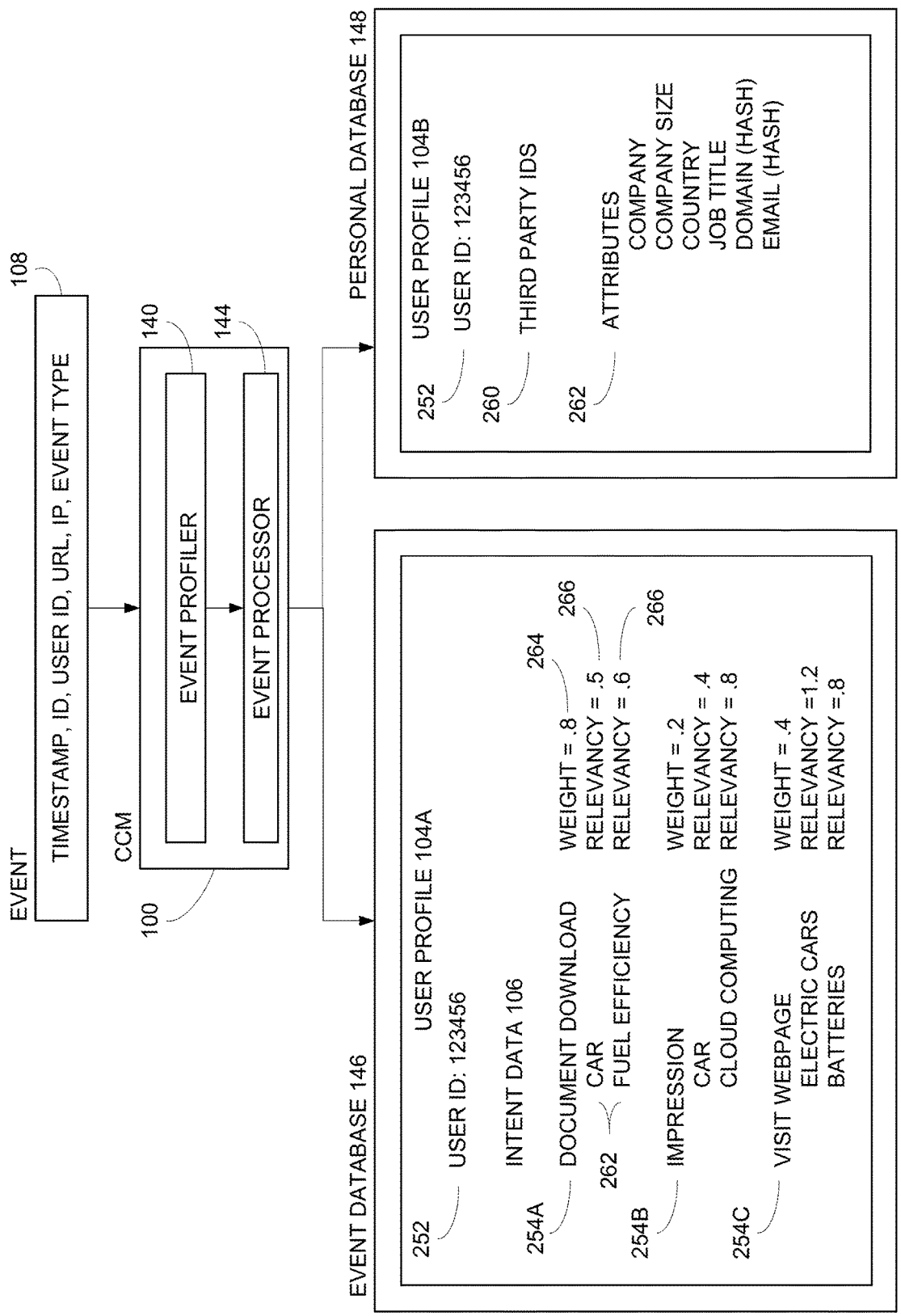
FIG. 4 depicts example events processed by the CCM.

FIG. 4 is a diagram showing how the CCM generates intent data. A CCM tag may send a captured raw event 108 to CCM 100. For example, the CCM tag may send event 108 to CCM 100 in response to a user downloading a white paper. Event 108 may include a timestamp indicating when the white paper was downloaded, an identifier (ID) for event 108, a user ID associated with the user that downloaded the white paper, a URL for the downloaded white paper, and an IP address for the launching platform for the content. Event 108 also may include an event type indicating the user downloaded an electronic document.

Event profiler 140 and event processor 144 generate intent data 106 from one or more events 108. Intent data 106 may be stored in a structured query language (SQL) database or non-SQL database. In one example, intent data 106 is stored in user profile 104A and includes a user ID 252 and associated event data 254.

Event data 254A is associated with a user downloading a white paper. Event profiler 140 identifies a car topic 262 and a fuel efficiency topic 262 in the white paper. Event profiler 140 may assign a 0.5 relevancy value to the car topic and assign a 0.6 relevancy value to the fuel efficiency topic.

Event processor 144 may assign a weight value 264 to event data 254A. Event processor 144 may assign larger a weight value 264 to more assertive events, such as downloading the white paper. Event processor 144 may assign a smaller weight value 264 to less assertive events, such as viewing a web page. Event processor 144 may assign other weight values 264 for viewing or downloading different types of media, such as downloading a text, video, audio, electronic books, on-line magazines and newspapers, etc.

CCM 100 may receive a second event 108 for a second piece of content accessed by the same user. CCM 100 generates and stores event data 254B for the second event 108 in user profile 104A. Event profiler 140 may identify a first car topic with a relevancy value of 0.4 and identify a second cloud computing topic with a relevancy value of 0.8 for the content associated with event data 254B. Event processor 144 may assign a weight value of 0.2 to event data 254B.

CCM 100 may receive a third event 108 for a third piece of content accessed by the same user. CCM 100 generates and stores event data 254C for the third event 108 in user profile 104A. Event profiler 140 identifies a first topic associated with electric cars with a relevancy value of 1.2 and identifies a second topic associated with batteries with a relevancy value of 0.8. Event processor 144 may assign a weight value of 0.4 to event data 254C.

Event data 254 and associated weighting values 264 may provide a better indicator of user interests/intent. For example, a user may complete forms on a publisher website indicating an interest in cloud computing. However, CCM 100 may receive events 108 for third party content accessed by the same user. Events 108 may indicate the user downloaded a whitepaper discussing electric cars and registered for a seminar related to electric cars.

CCM 100 generates intent data 106 based on received events 108. Relevancy values 266 in combination with weighting values 264 may indicate the user is highly interested in electric cars. Even though the user indicated an interest in cloud computing on the publisher website, CCM 100 determined from the third party content that the user was actually more interested in electric cars.

CCM 100 may store other personal user information from events 108 in user profile 104B. For example, event processor 144 may store third party identifiers 260 and attributes 262 associated with user ID 252. Third party identifiers 260 may include user names or any other identifiers used by third parties for identifying user 252. Attributes 262 may include an employer company name, company size, country, job title, hashed domain name, and/or hashed email addresses associated with user ID 252. Attributes 262 may be combined from different events 108 received from different websites accessed by the user. CCM 100 also may obtain different demographic data in user profile 104 from third party data sources (whether sourced online or offline).

An aggregator may use user profile 104 to update and/or aggregate intent data for different segments, such as publisher contact lists, companies, job titles, etc. The aggregator also may create snapshots of intent data 106 for a selected time periods.

Event processor 144 may generate intent data 106 for both known and unknown users. For example, the user may access a web page and enter an email address into a form field in the web page. A CCM tag captures and hashes the email address and associates the hashed email address with user ID 252.

The user may not enter an email address into a form field. Alternatively, the CCM tag may capture an anonymous cookie ID in event 108. Event processor 144 then associates the cookie ID with user identifier 252. The user may clear the cookie or access data on a different computer. Event processor 144 may generate a different user identifier 252 and new intent data 106 for the same user.

The cookie ID may be used to create a de-identified cookie data set. The de-identified cookie data set then may be integrated with ad platforms or used for identifying destinations for target advertising.

CCM 100 may separately analyze intent data 106 for the different anonymous user IDs. If the user ever fills out a form providing an email address, event processor then may re-associate the different intent data 106 with the same user identifier 252.

Figure 5:
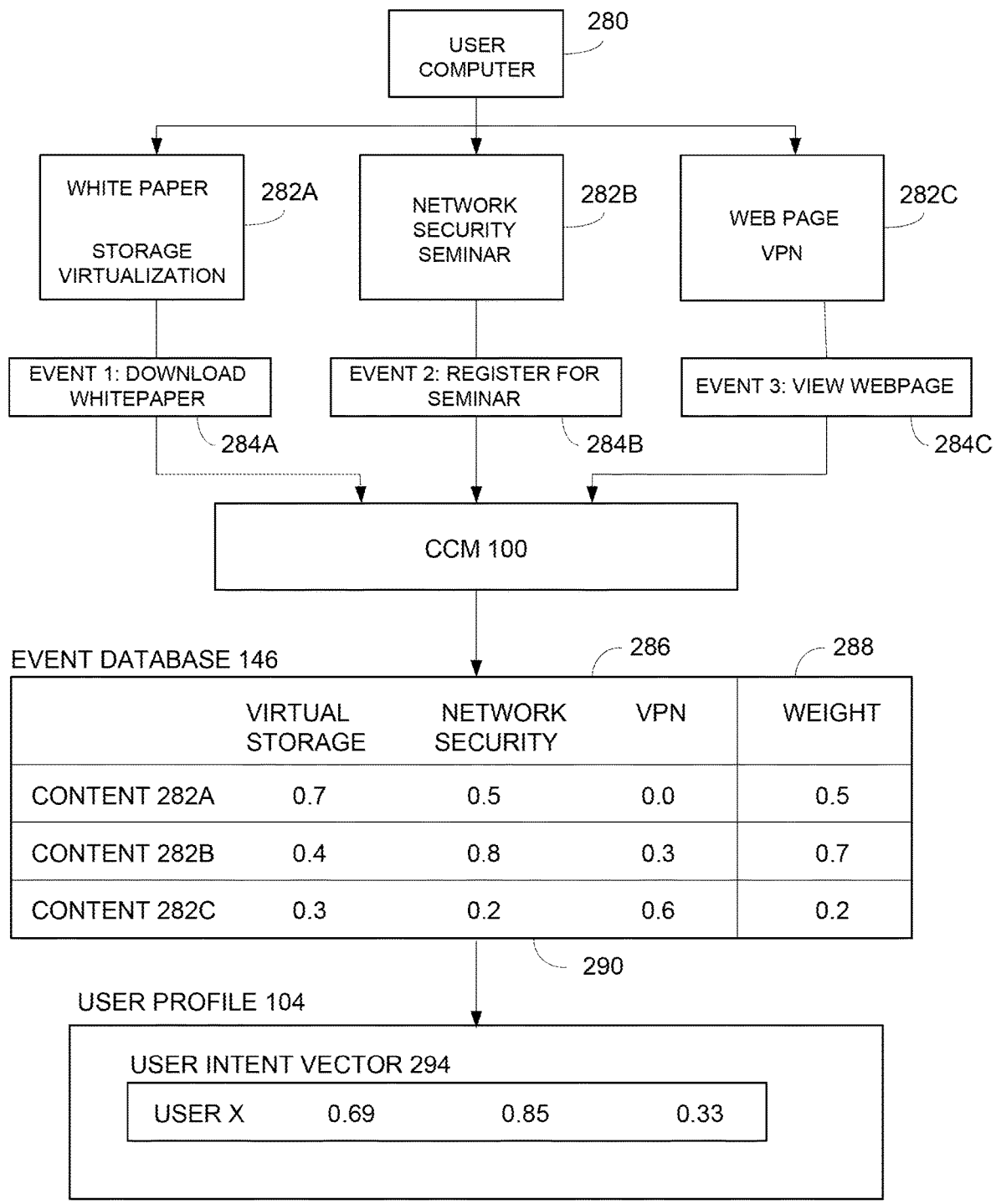
FIG. 5 depicts an example user intent vector.

FIG. 5 depicts an example of how the CCM generates a user intent vector from the event data described above in FIG. 4. A user may use computer 280 to access different content 282. For example, the user may download a white paper 282A associated with storage virtualization, register for a network security seminar on a web page 282B, and view a web page article 282C related to virtual private networks (VPNs). Content 282A, 282B, and 282C may come from the same website or come from different websites.

The CCM tags discussed above capture three events 284A, 284B, and 284C associated with content 282A, 282B, and 282C, respectively. CCM 100 identifies topics 286 in content 282A, 282B, and/or 282C. Topics 286 include virtual storage, network security, and VPNs. CCM 100 assigns relevancy values 290 to topics 286 based on known algorithms. For example, relevancy values 290 may be assigned based on the number of times different associated keywords are identified in content 282.

CCM 100 assigns weight values 288 to content 282 based on the associated event activity. For example, CCM 100 assigns a relatively high weight value of 0.7 to a more assertive off-line activity, such as registering for the network security seminar. CCM 100 assigns a relatively low weight value of 0.2 to a more passive on-line activity, such as viewing the VPN web page.

CCM 100 generates a user intent vector 294 in user profile 104 based on the relevancy values 290. For example, CCM 100 may multiply relevancy values 290 by the associated weight values 288. CCM 100 then may sum together the weighted relevancy values for the same topics to generate user intent vector 294.

CCM 100 uses intent vector 294 to represent a user, represent content accessed by the user, represent user access activities associated with the content, and effectively represent the intent/interests of the user. In another embodiment, CCM 100 may assign each topic in user intent vector 294 a binary score of 1 or 0. CCM 100 may use other techniques for deriving user intent vector 294. For example, CCM 100 may weigh the relevancy values based on timestamps.

Figure 6:
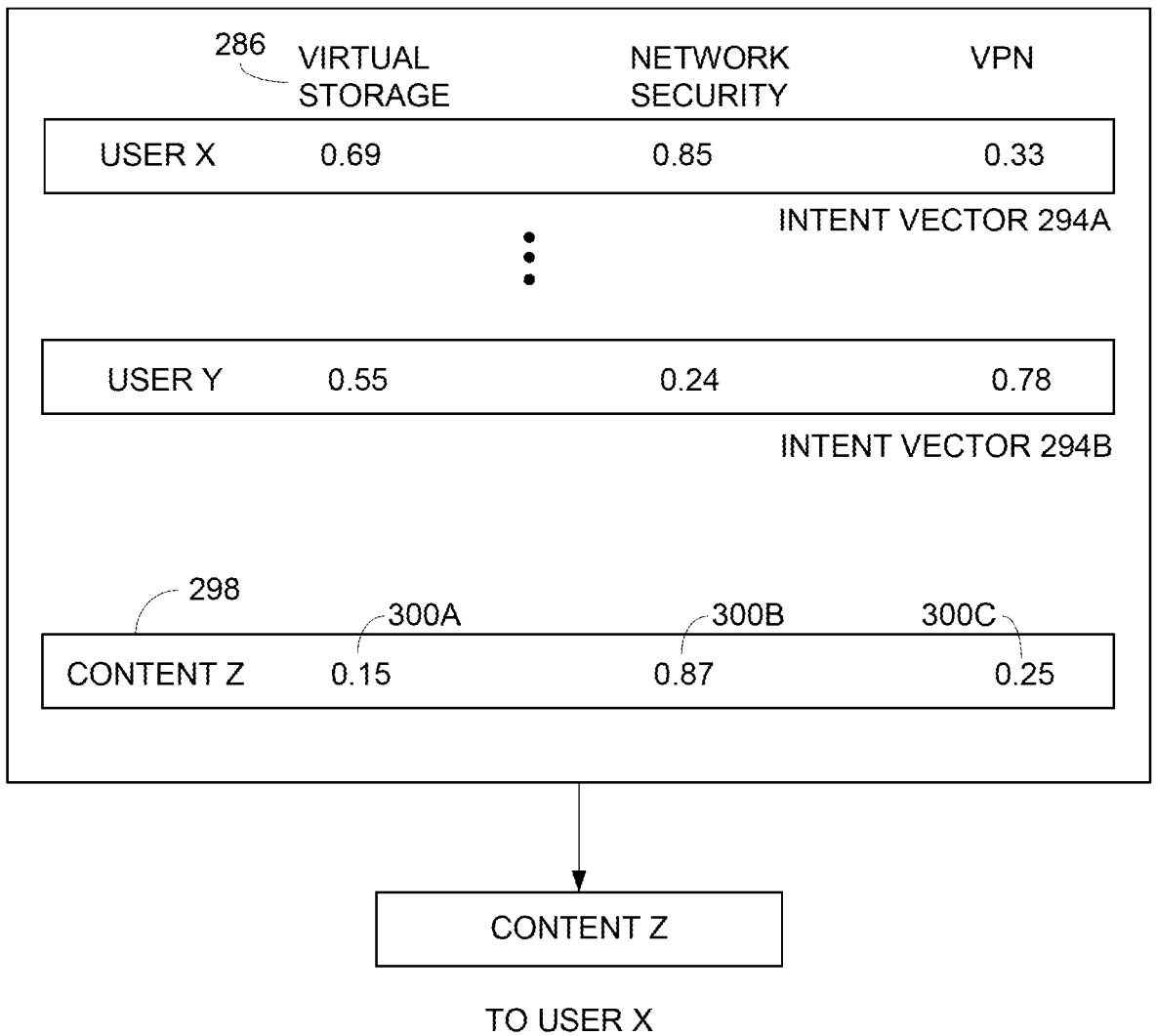
FIG. 6 depicts an example process for segmenting users.

FIG. 6 depicts an example of how the CCM segments users. CCM 100 may generate user intent vectors 294A and 294B for two different users. A publisher may want to email content 298 to a segment of interested users. The publisher submits content 298 to CCM 100. CCM 100 identifies topics 286 and associated relevancy values 300 for content 298.

CCM 100 may use any variety of different algorithms to identify a segment of user intent vectors 294 associated with content 298. For example, relevancy value 300B indicates content 298 is primarily related to network security. CCM 100 may identify any user intent vectors 294 that include a network security topic with a relevancy value above a given threshold value.

In this example, assume the relevancy value threshold for the network security topic is 0.5. CCM 100 identifies user intent vector 294A as part of the segment of users satisfying the threshold value. Accordingly, CCM 100 sends the publisher of content 298 a contact segment that includes the user ID associated with user intent vector 294A. As mentioned above, the user ID may be a hashed email address, cookie ID, or some other encrypted or unencrypted identifier associated with the user.

In another example, CCM 100 calculates vector cross products between user intent vectors 294 and content 298. Any user intent vectors 294 that generate a cross product value above a given threshold value are identified by CCM 100 and sent to the publisher.

Figure 7:
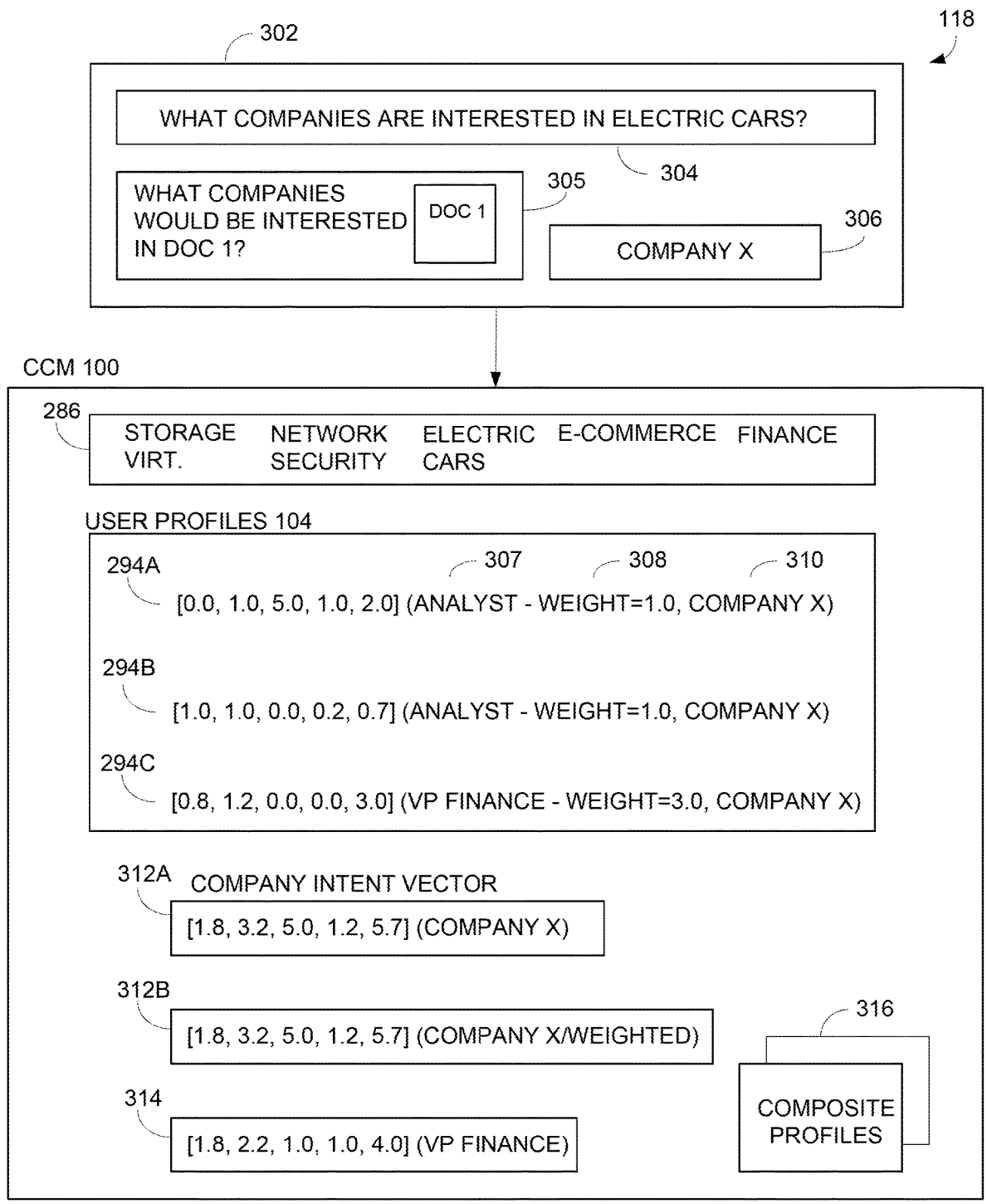
FIG. 7 depicts an example process for generating company intent vectors.

FIG. 7 depicts examples of how the CCM aggregates intent data. In this example, a publisher operating a computer 302 submits a search query 304 to CCM 100 asking what companies are interested in electric cars. In this example, CCM 100 associates five different topics 286 with user profiles 104. Topics 286 include storage virtualization, network security, electric cars, e-commerce, and finance.

CCM 100 generates user intent vectors 294 as described above in FIG. 6. User intent vectors 294 have associated personal information, such as a job title 307 and an employer company name 310. As explained above, users may provide personal information, such as employer name and job title in form fields when accessing a publisher or third party website.

The CCM tags described above capture and send the job title and employer name information to CCM 100. CCM 100 stores the job title and employer information in the associated user profile 104.

CCM 100 searches user profiles 104 and identifies three user intent vectors 294A, 294B, and 294C associated with the same employer name 310. CCM 100 determines that user intent vectors 294A and 294B are associated with a same job title of analyst and user intent vector 294C is associated with a job title of VP of finance.

In response to, or prior to, search query 304, CCM 100 generates a company intent vector 312A for company X. CCM 100 may generate company intent vector 312A by summing up the topic relevancy values for all of the user intent vectors 294 associated with company X.

In response to search query 304, CCM 100 identifies any company intent vectors 312 that include an electric car topic 286 with a relevancy value greater than a given threshold. For example, CCM 100 may identify any companies with relevancy values greater than 4.0. In this example, CCM 100 identifies company X in search results 306.

In one example, intent is identified for a company at a particular zip code, such as zip code 11201. CCM 100 may take customer supplied offline data, such as from a Customer Relationship Management (CRM) database, and identify the users that match the company and zip code 11201 to create a segment.

In another example, publisher 118 may enter a query 305 asking which companies are interested in a document (DOC 1) related to electric cars. Computer 302 submits query 305 and DOC 1 to CCM 100. CCM 100 generates a topic vector for DOC 1 and compares the DOC 1 topic vector with all known company intent vectors 312A.

CCM 100 may identify an electric car topic in the DOC 1 with high relevancy value and identify company intent vectors 312 with an electric car relevancy value above a given threshold. In another example, CCM 100 may perform a vector cross product between the DOC 1 topics and different company intent vectors 312. CCM 100 may identify the names of any companies with vector cross product values above a given threshold value and display the identified company names in search results 306.

CCM 100 may assign weight values 308 for different job titles. For example, an analyst may be assigned a weight value of 1.0 and a vice president (VP) may be assigned a weight value of 3.0. Weight values 308 may reflect purchasing authority associated with job titles 307. For example, a VP of finance may have higher authority for purchasing electric cars than an analyst. Weight values 308 may vary based on the relevance of the job title to the particular topic. For example, CCM 100 may assign an analyst a higher weight value 308 for research topics.

CCM 100 may generate a weighted company intent vector 312B based on weighting values 308. For example, CCM 100 may multiply the relevancy values for user intent vectors 294A and 294B by weighting value 1.0 and multiply the relevancy values for user intent vector 294C by weighting value 3.0. The weighted topic relevancy values for user intent vectors 294A, 294B, and 294C are then summed together to generate weighted company intent vector 312B.

CCM 100 may aggregate together intent vectors for other categories, such as job title. For example, CCM 100 may aggregate together all the user intent vectors 294 with VP of finance job titles into a VP of finance intent vector 314. Intent vector 314 identifies the topics of interest to VPs of finance.

CCM 100 also may perform searches based on job title or any other category. For example, publisher 118 may enter a query LIST VPs OF FINANCE INTERESTED IN ELECTRIC CARS? The CCM 100 identifies all of the user intent vectors 294 with associated VP finance job titles 307. CCM 100 then segments the group of user intent vectors 294 with electric car topic relevancy values above a given threshold value.

CCM 100 may generate composite profiles 316. Composite profiles 316 may contain specific information provided by a particular publisher or entity. For example, a first publisher may identify a user as VP of finance and a second publisher may identify the same user as VP of engineering. Composite profiles 316 may include other publisher provided information, such as company size, company location, company domain.

CCM 100 may use a first composite profile 316 when providing user segmentation for the first publisher. The first composite profile 316 may identify the user job title as VP of finance. CCM 100 may use a second composite profile 316 when providing user segmentation for the second publisher. The second composite profile 316 may identify the job title for the same user as VP of engineering. Composite profiles 316 are used in conjunction with user profiles 104 derived from other third party content.

In yet another example, CCM 100 may segment users based on event type. For example, CCM 100 may identify all the users that downloaded a particular article, or identify all of the users from a particular company that registered for a particular seminar.

Hardware and Software

Figure 8:
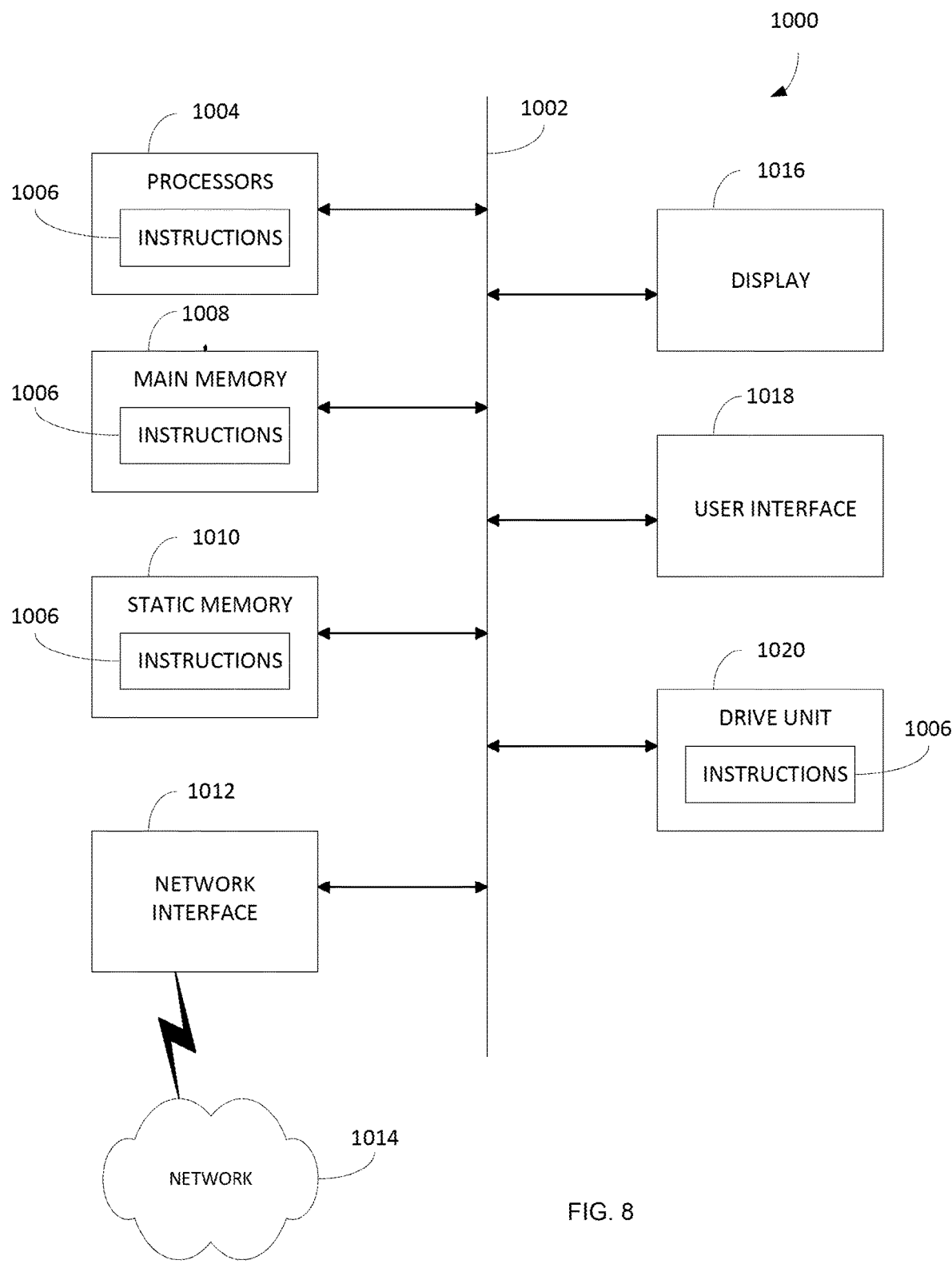
FIG. 8 depicts an example computing device used in the CCM.

FIG. 8 shows a computing device 1000 that may be used for operating the content consumption monitor and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such as a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A computer server for operating a content consumption monitor, the computer server comprising:
a processing device configurable to:

obtain network session events identifying users accessing content on websites including tags located in the content or webpages of the websites, the tags including instructions which cause computing devices to monitor and capture the network session events generated by the computing devices and send the captured network session events to the content consumption monitor, and the network session events at least identifying network addresses from which the content or websites are accessed by the users or at least identifying respective identifiers of the users;

identify different topics in the content accessed by the users;

generate user intent vectors for the users including relevancy values indicating interest levels in the topics;

identify a segment of the users associated with a same company;

generate a company intent vector from the user intent vectors for the segment of users associated with the company; and determine interest levels of the company in the topics based on the company intent vector.

2. The computer server of claim 1, wherein the processing device is further configurable to:

identify different segments of the users associated with different companies; and generate different company intent vectors from the user intent vectors for the different segments of users.

3. The computer server of claim 2, wherein the processing device is further configurable to:

receive a query to identify companies interested in specified topics; and identify the companies interested in the specified topics by identifying the company intent vectors including with relevancy values for the specified topics above a threshold value.

4. The computer server of claim 2, wherein the processing device is further configurable to:

repeatedly update the user intent vectors based on new events; and repeatedly update the company intent vectors with the updated user intent vectors for the segment of the users associated with the company.

5. The computer server of claim 4, wherein the processing device is further configurable to:

receive a query to identify companies interested in specified topics; and repeatedly update the companies interested in the specified topics based on the updated company intent vectors.

6. The computer server of claim 1, wherein the processing device is further configurable to:

receive events for a first time period;

generate a first set of user intent vectors from the events received for the first time period;

generate a first company intent vector from the first set of user intent vectors; and determine the interest levels of the company in a first set of topics for the first time period based on the first company intent vector.

7. The computer server of claim 6, wherein the processing device is further configurable to:

receive network session events for a second time period;

generate a second set of user intent vectors from the events received for the second time period;

generate a second company intent vector from the second set of user intent vectors; and identify interest levels of the company in a second set of topics for the second time period based on the second company intent vector.

8. The computer server of claim 1, wherein the processing device is further configurable to:

identify different geographic locations associated with the company; and generate different company intent vectors from the user intent vectors for the users associated with the company at the different geographic locations.

9. The computer server of claim 8, wherein the processing device is further configurable to:

receive a query to identify an interest level of the company in a specified topic at a specified one of the geographic locations; and identify the interest level of the company for the specified topics at the specified one of the geographic locations based on one of the company intent vectors associated with the specified one of the geographic locations.

10. The computer server of claim 1, wherein the processing device is further configurable to average the relevancy values in the user intent vectors for the segment of users associated with the same company to generate the company intent vector.

11. The computer server of claim 1, wherein the processing device is further configurable to identify the topics in the company intent vector with relevancy values over a threshold value as topics of interest to the company.

12. A system for operating a content consumption monitor, comprising:

a computing device; and a memory device storing one or more sequences of instructions which, when executed by a processor of the computing device, are operable to cause the computing device to:

receive network session events identifying actions of users accessing content on websites including tags located in the content or webpages of the websites, the tags including instructions which cause computing devices to monitor and capture the network session events generated by the computing devices and send the captured network session events to the content consumption monitor, and the network session events at least identifying network addresses from which the content or websites are accessed by the users or at least identifying respective identifiers of the users;

identify different topics in the content accessed by the users;

generate user intent data indicating interest levels of the users in the topics;

identify a segment of the users associated with a geographic location;

identify the user intent data for the segment of users associated with the geographic location; and determine the interest levels in the topics for the segment of users associated with the geographic location from the user intent data associated with the geographic location.

13. The system of claim 12, wherein the instructions are further operable to cause the computing device to:

identify different segments of the users associated with different geographic locations; and determine interest levels in the topics for the different segments of the users from the user intent data associated with the different segments of the users.

14. The system of claim 12, wherein the instructions are further operable to cause the computing device to:

receive a query to identify users in a specified geographic location interested in a specified topic; and identify the users in the specified geographic location interested in the specified topics from the user intent data for the segment of users associated with the specified geographic location.

15. The system of claim 12, wherein the instructions are further operable to cause the computing device to:

repeatedly update the user intent data with new network session events; and repeatedly update the interest levels in the topics for the segment of users associated with the geographic location based on the updated user intent data.

16. The system of claim 12, wherein the instructions are further operable to cause the computing device to:

identify a segment of the users associated with a same company;

generate a company intent data from the user intent data for the segment of the users associated with the company; and determine interest levels of the company in the topics based on the company intent data.

17. The computer server of claim 12, wherein the instructions are further operable to cause the computing device to:

generate company intent data for a segment of the users associated with a same company at the geographic location; and determine the interest levels of the company at the geographic location in the topics based on the company intent data.

18. The computer server of claim 12, wherein the instructions are further operable to cause the computing device to identify the topics with interest levels over a threshold value as topics of interest to the segment of users associated with the geographic location.

19. A computer server for operating a content consumption monitor, the computer server comprising:

a processing device configurable to:

receive network session events from tags located in content or webpages identifying content accessed by users on websites including the tags, the tags including instructions which cause computing devices to monitor and capture the network session events generated by the computing devices and send the captured network session events to the content consumption monitor, and the network session events at least identifying network addresses from which the content or websites are accessed by the users or at least identifying respective identifiers of the users;

send the network session events to a content analyzer to generate topics in the content and assign relevancy values to the topics;

generate user intent vectors that aggregate the topics and relevancy values identified in the content accessed by the same users;

identify the user intent vectors associated with a same company; and combine the identified user intent vectors together to generate a company intent vector, the company intent vector identifying interest levels of the company in the topics.

20. The computer server of claim 19, wherein the processing device is further configurable to:

identify different geographic locations associated with the user intent vectors; and aggregate together the user intent vectors associated with the same geographic locations and same company to generate company intent vectors for the different geographic locations.

* * * * *